United States Patent Office 3,467,475

Patented Sept. 16, 1969

3,467,475

DENSITOMETER INCORPORATING SELECTIVELY AND INDIVIDUALLY CONTROLLED COLOR FILTERS

Tino Celio, Buchs, and Heinrich Hogg, Otelfingen, Switzerland, assignors to Gretag Aktiengesellschaft, Regensdorf, Switzerland Continuation of application Ser. No. 409,117, Nov. 5, 1964. This application Sept. 9, 1968, Ser. No. 760,119
Claims priority, application Switzerland, Nov. 6, 1963, 13,599/63
Int. Cl. G01j 3/46
U.S. Cl. 356—179 6 Claims

ABSTRACT OF THE DISCLOSURE

Densitometer in which two light beams issued from a common source of light are applied along two comparison paths alternately in a rapid sequence onto one and the same photoelectric cell. In one of said comparison paths a standard of comparison such as a block of magnesium carbonate is interposed, and in the other one there are interposed a sample to be tested and a variable capacity filter such as a grey wedge. The comparison is realized by so adjusting the wedge position that both luminous fluxes impinging onto said cell along the two paths are equal. Such balance is automatically effected by means of a servoing device which moves the wedge in accordance with signals coming from the photoelectric cell. Thus, the position of the wedge constitutes a measure of the optical density of the sample. The densitometer further comprises a movable support, preferably a rotatable wheel, on which two series of corresponding filters, preferably color filters, are mounted for respective insertion in the two comparison paths. The arrangement of said support and filters with respect to the two comparison paths being such that if any desired filter of the one series of filters lies in the one comparison path the corresponding filter of the other series lies in the other comparison path. Each filter of the one series, preferably of the series which is interposable in the comparison path comprising the standard, is provided with an adjustable diaphragm. A common actuating means for the adjustment of said diaphragms is so adapted and arranged that each diaphragm is adjustable only when its associated filter lies in operative position. In the other positions and while filters are changed movements of the diaphragms are prevented so that adjustments remain as long as they may be needed.

This application is a continuation of patent application Ser. No. 409,117, filed Nov. 5, 1964, now abandoned.

This invention relates to a photoelectric measuring instrument in which either of at least two filters mounted on a common carrier can be selectably moved by adjustment of said carrier into a light beam (measuring or reference beam) impinging upon a photosensitive element.

In such measuring instruments a problem that often arises is that of also independently adjusting the intensity of the light beam impinging upon the photosensitive element, and hence of the magnitude of the generated photoelectric current, for any of the filters that are introduced into the beam. Generally the adjustment of intensity is required to be retained for at least a certain period. An important application of this facility is the adjustment of the zero reference standard in densitometers.

Densitometers are used for measuring the optical reflection or transmission density of a film or paper. The definition of optical density is related to a reference known as zero density. Absolute transmission densities are related to an ideally transparent medium, whereas absolute reflection density is related to an ideal reflector. The latter can be represented with a fair degree of accuracy by the surface of a magnesium oxide, barium oxide or like coating. However, in practice, relative densities are more important than absolute densities, relative densities being densities related to an arbitrarily selected standard of transparency or white.

It is therefore esential that a densitometer should be provided with means for adjustment to the selected zero density standard. This standard is provided by means adapted selectably to simulate the transmission or reflection of a larger or smaller quantity of light than than is actually transmited or reflected. In electronic densitometers, this is usually done by the algebraic addition of an electric current to the logarithm of the photo-current. However, means are also known in which an optical attenuator, such as a linear density wedge or a stop, is simply interpolated in the path of the beam.

However, when it is desired to make use of such an arrangement in colour densitometry, difficulties at once arise. First and foremost there are at least three measuring channels each including colour filters, and each channel must be adjusted to the selected reference standard. Moreover, it is desirable that only one adjustment for a given sample should be needed, that is to say for measuring the density on a given sample it should not be necessary to readjust each time the channel is changed. In other words, the adjustment made for each of the channels should be retained.

In conventional electrical zeroising systems this is achieved by associating a potentiometer with each of the channels. This method is simple, but it calls for the provision of a multitude of components and a multitude of controls which must be operated separately in their correct association with the several channels. Unskillful handling may easily result in one of the potentiometer setting being accidentally upset, necessitating fresh adjustment.

Optical and mechanical attenuating means have not hitherto been used in smaller densitometers. The principal reason appears to be that mechanically operated optical attenuating means are rather complicated.

It is an object of the present invention to provide an instrument of simple and convenient construction suitably adapted for adjusting the intensity of a light beam impinging upon a photosensitive element independently in respect of each of selected filters in such a way that the adjustment made for each of the filters remains effective for as long as may be needed. According to the invention there is provided a photoelectric measuring instrument, wherein at least two filters mounted on a common carrier are arranged to be selectably moved by adjustment of said carrier into the path of a light beam arranged to impinge upon a photosensitive element, and wherein an adjustable stop is associated with each filter, each stop being movable across its associated filter by the same common actuating means arranged so as to be capable of moving each stop when its associated filter has been introduced into the path of the light beam.

In order to permit the position of the stop to be finely adjusted, a reduction gearing for the fine adjustment of the angular deflection of the stop may be included in the actuating means.

The stops, which are desirably sector-shaped, may have a geometrical conformation that will establish a logarithmic relationship between the area of the obscured filter aperture and the angular deflection of the stop.

In order to enable the invention to be more readily understood, reference will now be made to the accompanying drawings, which illustrate diagrammatically and by way of example an embodiment thereof, and in which.

Figure 1:
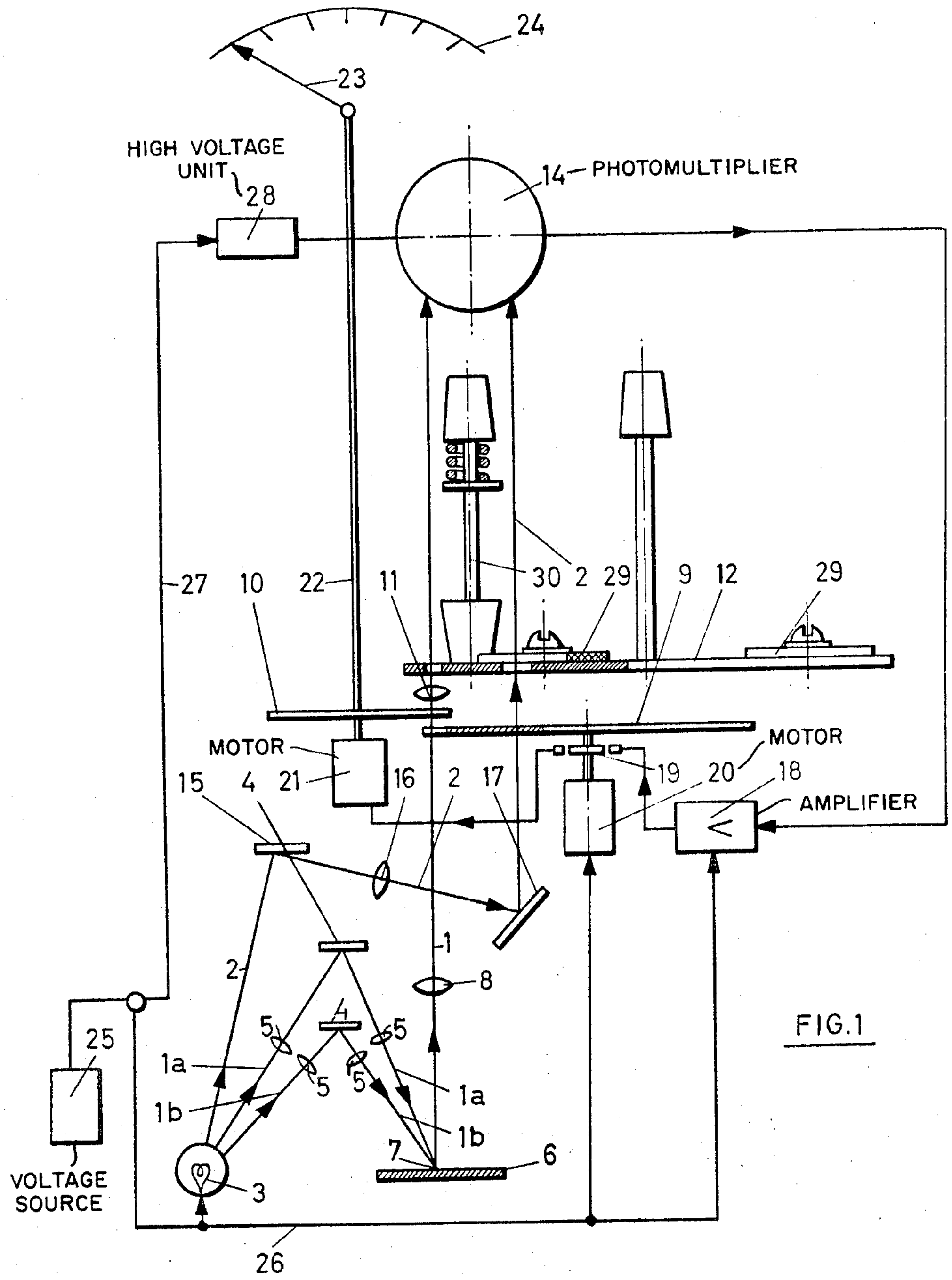
FIGURE 1 illustrates the general lay-out of the components of a densitometer.

Referring now to FIGURE 1, there is shown the general layout of a densitometer, in which the intensity of a measuring beam 1 reflected by a sample, the reflection density of which is to be measured, is modified by a variable grey plate 10 until it equals that of a reference beam 2. The position of the variable grey plate 10 will then provide a measure of the reflection density of the sample.

The measuring beam 1 and the reference beam 2 are both supplied by a common light source 3. The measuring beam 1 first comprises two component rays 1*a* and 1*b* projected by reflecting mirrors 4 and lenses 5 upon the sample 6, to be reflected therefrom at a spot 7 where the density is to be ascertained. A lens 8 collects part of the reflected light and sends it through a rotatable chopper disc 9, the variable grey plate 10, a further lens 11 and a filter wheel 12 to a light-sensitive element in the form of an electron multiplier 14.

The reference beam 2 is provided by reflection of part of the light from lamp 3 at a reflecting surface 15. The nature of this surface is in principle quite arbitrary but, as already mentioned, it should generally be a white surface of good reflecting properties, such as magnesia. The reference beam is parallelised by a lens 16 and then reflected by a mirror 17 through the chopper disc 9 and the filter wheel 12 on to the electron multiplier 14.

In the operation of this densitometer, the measuring beam 1 and the reference beam 2, according to the momentary position of the uniformly revolving chopper disc 9, impinge alternately upon the electron multiplier 14. The corresponding electrical signal derived from the electron multiplier controls an amplifier 18 the output of which is applied to a motor 21 through a polarity reverser 19 revolving in synchronism with the chopper disc 9. The rotor shaft of this motor 21 drives the variable grey plate 10 through which the measuring beam 1 passes, as well as a pointer 23 mounted on the end of a shaft extension 22.

During a first interval of time in which only the measuring beam 1 passes through the chopper disc 9, the motor 21 will receive a corresponding D.C. signal A generated by the measuring beam and its rotor will therefore turn through an angle $\alpha$ in one direction of rotation. During the ensuing time interval in which the chopper disc allows only the reference beam 2 to pass, motor 21 is energized by a D.C. signal B generated by the reference beam. However, the polarity of this signal is now reversed. Consequently the rotor of motor 21 will turn through an angle $\beta$ in the opposite direction. If both signals A and B are equal, i.e., if $\alpha=\beta$, and provided the frequency of the chopper is high enough, the motor 21 will actually remain stationary. However, if one of the signals is greater than the other i.e., if $\alpha\neq\beta$ then the motor will rotate through a greater angle in one direction during one of the time intervals than in the opposite direction during the other time interval, and in effect it will therefore, rotate the variable grey plate and the pointer through a given small difference angle. However, rotation of the variable grey plate changes the intensity of the measuring beam in such a way that the system will swing periodically into a stable position of rest. The position of the pointer 23 in relation to a scale 24 will then provide a measure of the relative or absolute reflection density of the measured surface according to the calibration of the scale.

Current is supplied to the several electrical components of the system by voltage source 25 (mains or battery). A wire 26 supplies a lamp constituting the light source 3, the amplifier 18 and the chopper disc motor 20, whereas a second wire 27 feeds a high voltage unit 28 and the electron multiplier 14.

"Zero density" is conventionally understood to be a standard value corresponding to the value of "white" in a measured sample. Since this standard is a specific property of each sample, an adjustment to the required zero standard must be effected whenever the sample is changed, and it must be checked at periodic intervals. For effecting coarse adjustment, use is made of the filter disc 12 which is fitted with colour and neutral filters and carries sector-shaped stops 29 in accordance with the invention. These sector-shaped stops can be individually adjusted by means generally indicated at 30. They control the intensity of the beam passing through the related filter. In principle these stops may be associated either with the filters in the reference beam or with the filters in the measuring beam. Since the electron multiplier functions more efficiently at higher intensities than at lower intensities, it is preferred to reduce only the intensity of the reference beam which is generally the brighter beam of the two. If a white surface 6 representing "zero" density is replaced by a "denser white" (grey), then the reference beam 2 must be attenuated accordingly by the interposition of filters and the reduction of the filter aperture by the stops.

Figure 3:
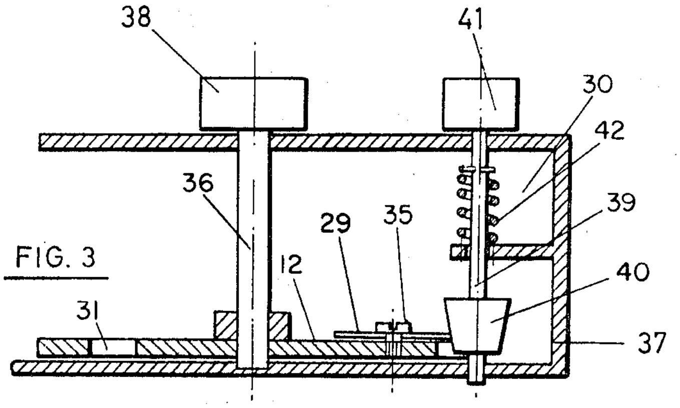
FIGURE 3 is a section of the filter wheel taken on the line III—III in FIGURE 2, showing mechanism for adjusting the stops.
Figures 2, 5:
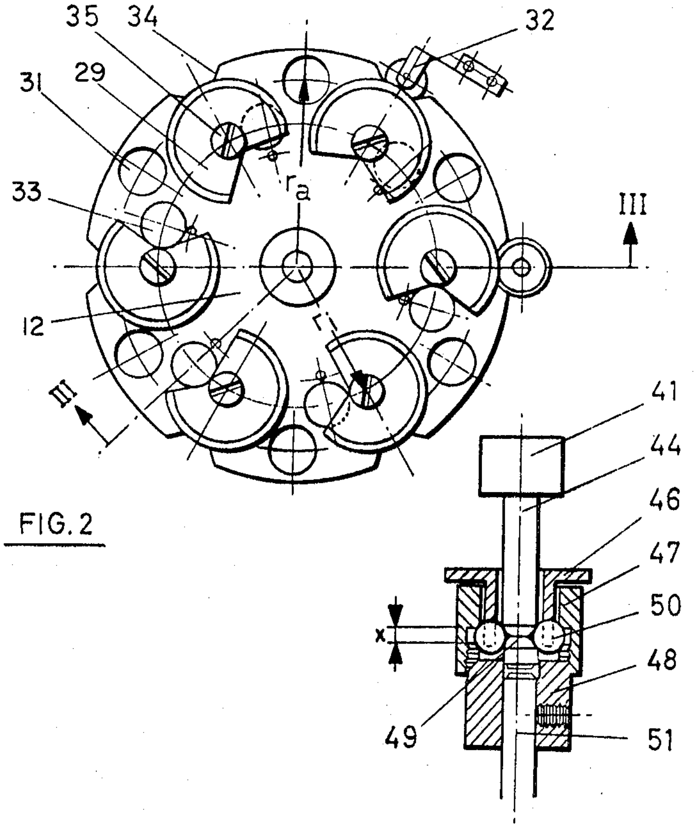
FIGURE 2 is a plan view of a filter wheel and associated sector-shaped stops of the densitometer.
FIGURE 5 is an axial section showing a reduction gearing included in the stop actuating means.

The filter wheel 12 will now be described in greater detail with reference to FIGURES 2 and 3, which latter shows the filter wheel from the rear of the paper as compared with FIGURE 1. Six openings 31, each containing a colour or neutral filter, are disposed at equidistant angular intervals on an outer circle of radius $r_a$. After having been moved into the required position by rotation of the filter wheel 12 until an arresting roller 32 engages a notch 34, these filters serve for filtering the measuring beam 1 in the desired spectral region. Six similar openings 33 fitted with filters associated with sector-shaped stops 29 for the reference beam 2 are disposed at equidistant intervals on an inner circle of radius $r_i$. In order to prevent the stops from being accidentally operated they are mounted on the base and held in position by frictionally self-locking fastening elements 35.

According to the invention a stop cannot be adjusted until its associated filter has been moved into the path of the reference beam. To this end the mechanism 30 shown in FIGURE 3 is provided. The filter wheel 12 affixed to a shaft 36 mounted inside a casing 37 can be rotated by means of a knob 38. The same casing also contains a second shaft 39 carrying a coned friction wheel 40 operable by a knob 41. A spring 42 urges the shaft 39 and the cone wheel 40 upwards so that normally the filter wheel is freely rotatable, apart from the arresting action of the roller 32. When the knob 41 is depressed, the friction wheel 40 engages the edge of a sector-shaped stop 29 which can then be turned by rotation of the setting knob and by its frictional entrainment by the cone wheel 40.

Figure 4:
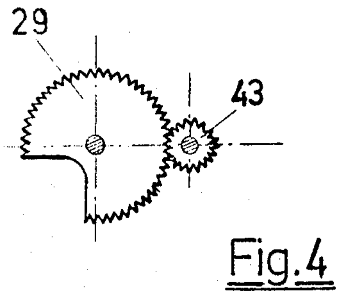
FIGURE 4 shows a modification of a coupling between a stop and actuating means.

The transmission of rotary motion from the shaft 39 to the sector-shaped stop 29 may naturally be effected in some alternative way. A different arrangement is illustrated in FIGURE 4 where a pinion 43 is arranged to mesh with a sector-shaped stop 29 provided with a toothed peripheral edge. FIGURE 5 shows an improved embodiment of adjusting mechanism for setting the sector-shaped stops permitting a finer adjustment of the reference standard of the densitometer with the aid of reduction gearing of a kind as such already known to the art. This type of gearing is described in the publication "Lexikon der Technik," by Lueger, published 1960, volume 1, page 418. The core of this gearing is formed by four captive balls 50 in a stationary cage 46. Rotation of a shaft 44 by means of the knob 41 causes these balls 50 to be rotated, without being axially displaced by frictional contact with a circular groove 49 in the shaft. The sides of the balls facing away from the groove frictionally engage and therefore simultaneously rotate a threaded bushing 47 and an associated hub 48 about a shaft 51.

The reduction ratio is determined by the distance $x$ between the points of contact of the threaded bushing 47 and of hub 48 respectively with the balls 50, the smallest reduction ratio being obtained when $d=0$ and the theoretically largest when $d$=the diameter of the balls. The shaft 51 performs the same functions as the shaft 39 in FIGURE 3.

A particular problem is the geometrical shape of the stops. According to another feature of the invention each stop is so shaped and so placed in relation to the filter that a linear relationship is established between the deflection angle $\alpha$ and the corresponding density change $\Delta d$ and hence the deflection of the pointer of the densitometer.

Assuming that the density of the filter when the stop is fully open is $d=d_1$. The above mentioned requirement would imply that at a deflection angle $\alpha$ of the stop the filter density should be $d=c_1\alpha+d_1$, where $c_1$ is a constant. When the stop is fully closed or when the angle of deflection is a maximum $\alpha_0$, the density would thus be $d_2=c_1\alpha_0+d_1$. The difference $\Delta d=d_2-d_1=c_1\alpha_0$ is therefore the range within which adjustment can be effected. In practice a $\Delta d=0.5$ to 1.0 is desirable.

Figure 6:
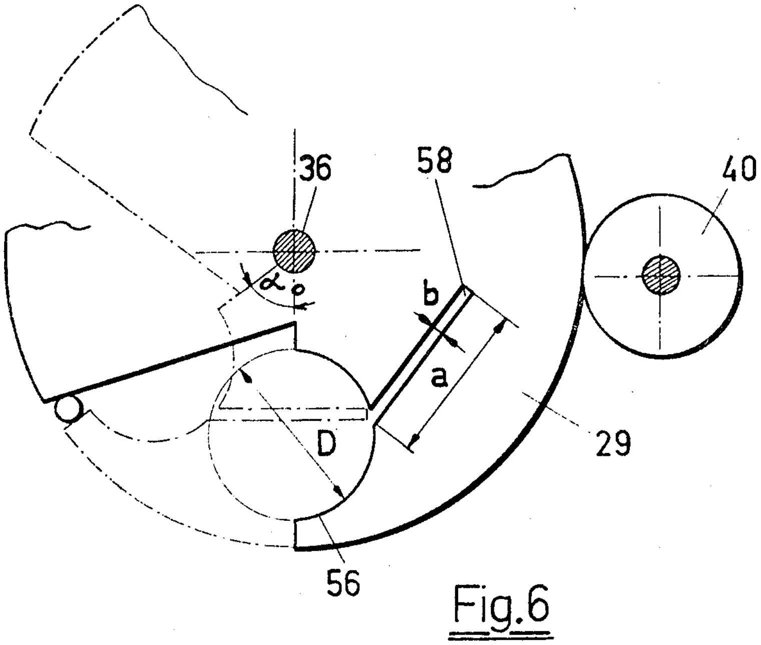
FIGURE 6 is a plan view of a sector stop of particular configuration.

The surface area F of the filter and the transparency T of the filter are linearly related: $F=c_2T$, where $c_2$ is another constant, whereas the relationship between transparency and density $d$ is logarithmic: $d=\log (1/T)$. The logarithmic relationship requires that during the initial deflection of the stop the rate at which the obscured area increases should be as high as possible, but that prior to complete obturation the rate at which the filter is obscured should be low. This requirement is satisfied with satisfactory accuracy by a stop 29 shaped as illustrated in FIGURE 6.

The stop aperture is defined, on the one hand, by a semicircle 56 of diameter D which, for the satisfaction of the condition that initially the increase of the obscured area due to a small increase of $\alpha$ should be a maximum, is arranged to be equal to the diameter of the filter aperture, and on the other hand, by a slot 58 of length $a$ and width $b$. It will be readily understood from the final position ($\alpha=\alpha_0$) as indicated by dotted lines, that in this position the size of the obscured area is substantially determined by the slot 58. The area of the slot depends upon the required adjustability range $\Delta d$, $d_1$ corresponding to a filter area $$F_1=\frac{\pi}{4}D^2$$

and $d_2$ to an area $F_2=a.b$ according to the ratio $$\Delta d=d_2-d_1=\log 1/T_2-\log 1/T_1 =\log T_1/T_2=\log F_1/F_2$$

For instance, if an adjustability range $\Delta d=1.0$ is desired, this means that $F_1=10F_2$ or $$a\cdot b=0.1\frac{\pi}{4}D^2$$

Since it is desirable that the illumination of the measured spot should be ideally uniform and this is not always possible to achieve in actual practice, the area $F_2$ which determines maximum density is preferably rectangularly shaped and so located on the stop that it will contain the centre of the filter aperture when the stop is completely closed. The length $a$ is designed to be roughly equal to the aperture diameter D so that the rate of change of area $F_2$ is substantially determined by the width $b$ of the rectangle.

Figure 7:
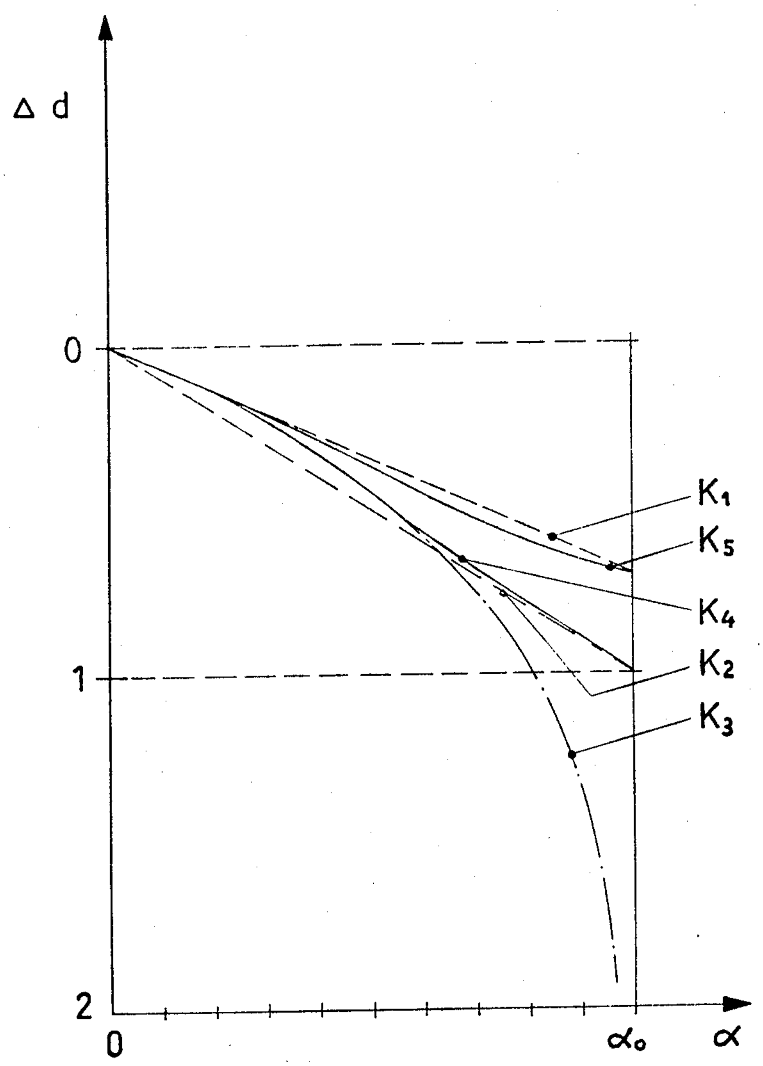
FIGURE 7 is a graph showing curves representing the functional relationship between the deflection angle of stops of different kinds and the obscured area of the filter aperture.

FIGURE 7 shows a number of theoretical and practical curves representing the density differential $\delta d=d-d_1$ as a function of the opening angle of the stop, $d$ being the density at angle $\alpha$ and $d_1$ the density when the stop is fully open ($\alpha=0$). The curves $K_1$ and $K_2$ are ideal cases of $\delta d=c_1\alpha$. The constant $c_1$ is determined by the desired density range $\Delta d=d_2-d_1$ ($d_2$=density when stop is closed, $\alpha=\alpha_0$), curve $K_1$ relating to a $\Delta d=0.7$ and $K_2$ to a $\Delta d=1.0$. The other three curves $K_3$, $K_4$ and $K_5$ represent results of practical measurements with three different slot areas, viz, $F_2=0$ (curve $K_3$), $F_2=0.1F_1$ ($\Delta d=\log 10=1.0$) (curve $K_4$) and $F_2=0.2F_1$ ($\Delta d=\log 5\sim 0.7$) (curve $K_5$), the areas $F_2$ of curves $K_4$, $K_5$ differing only in width, the length $a$ being the same.

Curves $K_4$ and $K_5$ are fully satisfactory for all practical needs.

We claim:

1. In a densitometer, comprising a light source, a light-reflecting reference surface, a photosensitive element, an optical system for directing a first path of light from said light source to said reference surface and from the latter to said photosensitive element and a second path of light from said light source to a sample to be tested and from said sample to said photosensitive element, means for causing said first and second light paths to impinge alternately on said photosensitive element, a variable grey member interposed in said second light path and movable to vary the intensity thereof, means operable by the photosensitive element to move said variable grey member in dependence upon a difference in signals generated by said photosensitive element as the result of the impingement thereon of first and second light paths of different intensity, indicating means for indicating the position of said variable grey member to give an indication of the reflection density of said sample as compared with said reference surface, the improvement comprising a movable carrier member, at least two pairs of first and second color filters mounted on said carrier member which is movable to interpose the first filters into said first light path and the second filters into said second light path, the first and second color filters of each pair passing the same definite band of wave lengths and the filters of the different pairs collectively covering the visual spectral range, adjustable aperture stops each associated with a respective first filter, means for mounting each stop on said carrier member, a common actuating means with a handle permitting adjustment of each stop only when its associated filter has been introduced into the first light path, said common actuating means being so constructed that two separate movements are needed for the adjustment of the stop, namely, the first against the action of a spring for coupling the actuating means with the stop, and the second for the adjustment itself.

2. Densitometer as claimed in claim 1 wherein each stop is mounted on the carrier in a frictionally self-locking manner and has the shape of a circular disc with a substantially sector-shaped cut-out, and said actuating means comprises a coned wheel fixed on a rotatable and axially displaceable shaft with said handle serving (a) for rotation of said actuating means and (b) for axial displacement of said actuating means against the action of said spring, and said actuating means being so arranged with respect to the filter carrier member that in the displaced position of said shaft the periphery of said wheel is in engagement with the circular periphery of the stop which is introduced into the first light path.

3. Densitometer as claimed in claim 2, wherein the circular periphery of each stop and said wheel are provided with friction surfaces.

4. Densitometer as claimed in claim 2, wherein said wheel is a pinion and the circular periphery of each stop is appropriately toothed.

5. Densitometer as claimed in claim 2, wherein said shaft is divided into two parts and a reduction gearing is interposed between said two parts.

6. Densitometer as claimed in claim 2, wherein said sector-shaped cut-out is so shaped that the relationship between the obscured area of the filter and the deflection angle of the stop is at least approximately logarithmic.

References Cited

UNITED STATES PATENTS

| | | |
|---|---|---|
| 1,921,862 | 8/1933 | Bickley. |
| 2,185,690 | 1/1940 | Lane. |
| 2,287,322 | 6/1942 | Nelson. |
| 2,292,230 | 8/1942 | Lemon. |
| 2,871,776 | 2/1959 | Calamai. |
| 3,270,348 | 8/1966 | Lesage et al. |
| 3,319,512 | 5/1967 | Isreeli. |
| 3,328,587 | 6/1967 | Brown et al. |
| 3,340,764 | 9/1967 | Bergson. |

FOREIGN PATENTS

| | | |
|---|---|---|
| 894,581 | 12/1944 | France. |

RONALD L. WIBERT, Primary Examiner

WARREN A. SKLAR, Assistant Examiner.

U.S. Cl. X.R.

356—188, 195, 205